US012624783B2

(12) United States Patent
      Peng

(10) Patent No.: US 12,624,783 B2
(45) Date of Patent: May 12, 2026

(54) CONNECTOR AND CONNECTING SYSTEM

(71) Applicant: Southco Manufacturing and Technology (Shenzhen) Co., Ltd., Shenzhen (CN)

(72) Inventor: Jingyao Peng, Shenzhen (CN)

(73) Assignee: Southco Manufacturing and Technology (Shenzhen) Co., Ltd., Shenzhen (CN)

( * ) Notice: Subject to any disclaimer, the term of this patent is extended or adjusted under 35 U.S.C. 154(b) by 48 days.

(21) Appl. No.: 18/386,991

(22) Filed: Nov. 3, 2023

(65) Prior Publication Data

US 2024/0175528 A1      May 30, 2024

(51) Int. Cl.
      *F16L 27/02*      (2006.01)
      *F16L 3/205*      (2006.01)
      *F16L 37/50*      (2006.01)

(52) U.S. Cl.
      CPC ............. *F16L 27/026* (2013.01); *F16L 3/205* (2013.01); *F16L 37/505* (2013.01)

(58) Field of Classification Search
      CPC ....... F16L 3/205; F16L 3/2053; F16L 3/2056; F16L 2201/10; F16L 37/505; F16L 27/10; F16L 27/1021; F16L 27/026
      USPC ................................................... 285/93, 224
      See application file for complete search history.

(56) References Cited

U.S. PATENT DOCUMENTS

| | | | |
|---|---|---|---|
| 3,292,917 A | 12/1966 | Sherburne | |
| 3,741,238 A | 6/1973 | Lacey | |
| 4,690,365 A * | 9/1987 | Miller | F16L 27/10 |
| | | | 248/188.4 |
| 9,790,948 B2 * | 10/2017 | Liu | F16L 27/10 |
| 10,405,458 B2 | 9/2019 | Fukunaga | |
| 2018/0054024 A1 | 2/2018 | Leigh et al. | |
| 2022/0381387 A1 | 12/2022 | Fysikopoulos et al. | |
| 2023/0050005 A1 | 2/2023 | Yang et al. | |
| 2025/0012389 A1 | 1/2025 | Hartmann | |

FOREIGN PATENT DOCUMENTS

| | | |
|---|---|---|
| CN | 107408781 A | 11/2017 |
| CN | 109764186 A | 5/2019 |
| CN | 210041118 U | 2/2020 |

(Continued)

OTHER PUBLICATIONS

Extended European Search Report issued May 19, 2025, by the European Patent Office in corresponding European Patent Application No. 25152006.0-1015. (10 pages).

(Continued)

*Primary Examiner* — Matthew Troutman
*Assistant Examiner* — Fannie Kee
(74) *Attorney, Agent, or Firm* — Buchanan Ingersoll & Rooney PC

(57) ABSTRACT

A connector is mounted to a first object and connected between an outlet device and an inlet device to direct a fluid. The connector comprises: a housing mounted to the first object; a pipeline penetrating the housing in a flow direction of the fluid and comprising an outlet end connected to the outlet device and an inlet end connected to the inlet device; a floating device disposed on the housing and floatingly connected to the pipeline, allowing the pipeline to float in the radial direction transverse to a flow direction of the fluid with respect to the housing.

15 Claims, 19 Drawing Sheets

(56)                    References Cited

FOREIGN PATENT DOCUMENTS

| CN | 111734887 A | 10/2020 |
|---|---|---|
| CN | 114599909 A | 6/2022 |
| CN | 219013572 U | 5/2023 |
| DE | 39 16 278 A1 | 11/1989 |
| DE | 10 2010 033 757 A1 | 2/2012 |
| DE | 10 2014 102 596 A1 | 6/2015 |
| FR | 3 102 529 A1 | 4/2021 |
| IT | 102012902017273 A1 | 7/2013 |
| TW | 202305273 A | 2/2023 |
| WO | 2023/081947 A1 | 5/2023 |

OTHER PUBLICATIONS

Office Action (Notice of Examination Opinion) issued Aug. 8, 2025, by the Taiwan Intellectual Property Office Ministry of Economic Affairs in corresponding Taiwanese Patent Application No. 114101872 and an English translation of the Office Action. (26 pages).

Office Action issued by the U.S. Patent and Trademark Office in the U.S. Appl. No. 18/422,780, mailed Aug. 14, 2025, U.S. Patent and Trademark Office, Alexandria, VA. (13 pages).

Office Action issued Sep. 5, 2024, by the Taiwan Patent Office in corresponding Taiwanese Patent Application No. 112141377 and an English machine translation of the Office Action. (22 pages).

\* cited by examiner

100

100

100

100

100

100

100

100

100

100

100

110     116     113
112
115
114
111
114
114     114
111
117     114

110     113
115
112
117
114
114
111
114
114
116     111

120

122

124

125

124

123

121

120

121

123

124

124

122

130

131

132

130
133

132

131

140

150

100

100

118

118

119

116

112

116

119

116

111

112

120

122

123

121

121

120

123

122

120

A

A

170

118

CONNECTOR AND CONNECTING SYSTEM

CROSS-REFERENCE TO RELATED APPLICATIONS

This application claims priority to Chinese Application No. 202223170065X, filed on Nov. 25, 2022, entitled "CONNECTOR AND CONNECTING SYSTEM", which is incorporated herein by reference in its entirety.

TECHNICAL FIELD

The present disclosure relates to a connector, in particular a floating connector, and a connecting system including the connector.

BACKGROUND

Connector is a common device. In an application environment such as a server, a connector is required to direct cooling liquid from an outlet pipeline (e.g., a source of cooling liquid) to an inlet pipeline (e.g., the interior of the server). In some cases, the pipeline connections for the cooling liquid are not permanently connected, but are temporarily connected. That is, the connector may switch between different servers, the connector may connect to one server during a period of time, and connect to another server during another period of time.

Therefore, on the one hand, it is desirable that there is a quick connection function between the connector and the server to allow convenient and quick switching of the connection manner. On the other hand, it is desirable that the connector has a floating connection function, and that the alignment of the connector and the inlet pipeline can be ensured even if there is a certain error between the installation environment of the connector and the inlet pipeline.

SUMMARY

A connector according to the present application is mounted to a first object and connected between an outlet device and an inlet device to direct a fluid. The connector includes: a housing mounted to the first object; a pipeline penetrating the housing in a flow direction of the fluid and including an outlet end connected to the outlet device and an inlet end connected to the inlet device; a floating device disposed on the housing and floatingly connected to the pipeline, allowing the pipeline to float in a radial direction transverse to the flow direction of the fluid with respect to the housing.

In one embodiment, the floating device includes at least one bolt and at least one spring, the bolt penetrates a sidewall of the housing in the radial direction, and the spring is abutted between the bolt and the sidewall of the pipeline, allowing the pipeline to float in the radial direction.

In one embodiment, four sets of the floating devices are surroundingly disposed on the housing at uniform intervals in a circumferential direction, and each set of the floating devices includes two floating devices arranged in the flow direction.

In one embodiment, the connector further includes: at least one gasket having an annular shape and sleeved on the pipeline, and abutting against at least one end wall of the housing in the flow direction to prevent inclination of the pipeline with respect to the housing.

In one embodiment, a first limiting portion protruding outwards in the flow direction is provided on the end wall of the housing, and the first limiting portion at least partially surrounds the periphery of the gasket so as to prevent the gasket from sliding with respect to the housing.

In one embodiment, a notch which is inwardly recessed in the radial direction is provided in the periphery of the gasket; and a second limiting portion extending outwards in the flow direction is provided on the end wall of the housing, and the second limiting portion corresponds to the position of the notch so as to prevent the gasket from sliding with respect to the housing.

In one embodiment, the inlet end of the pipeline is also sleeved with a snap ring, and the snap ring is generally E-shaped and abuts against the outer side of the gasket at the inlet end.

In one embodiment, the housing has two pairs of the sidewalls opposite to each other, and a mounting groove is provided in one pair of the sidewalls along a surface of each sidewall, the mounting groove extends over a partial height of the sidewall so that the housing is mounted to the first object by a bolt penetrating the remaining height of the sidewall.

In one embodiment, the pipeline includes an intermediate segment connected between the outlet end and the inlet end, and the outlet end and the inlet end are both located outside of the housing, the intermediate segment is located inside of the housing.

In one embodiment, the inlet end of the pipeline is provided with a mounting nut for connecting to the outlet device; the inlet end of the pipeline is provided with: an inlet connector mounting hole located at the center of the inlet end; and at least one guide mounting hole surrounding the inlet connector mounting hole; and the guide mounting hole is located radially outside of the intermediate segment when viewed in the flow direction.

In one embodiment, the radial position of the floating device with respect to the housing is adjustable to change the floating position of the pipeline.

In one embodiment, the housing includes: a first housing and a second housing assembled to each other in a transverse direction perpendicular to the flow direction to form the housing.

In one embodiment, the floating device includes at least one spring, the spring is abutted between the bolt and an inner side of the sidewall of the pipeline, allowing the pipeline to float in the radial direction.

A connecting system according to the present application includes: the connector according to the present application, wherein the first object is a mounting base; the inlet device includes an inlet connector and at least one guide, the inlet connector is connected to an inlet connector mounting hole at the center of an inlet end of the pipeline; and the guide surrounds the inlet connector and is connected to a guide mounting hole at a periphery of an inlet end of the pipeline.

DETAILED DESCRIPTION

While the present disclosure is illustrated and described herein with reference to specific embodiments, the present disclosure should not be limited to the details shown. Rather, various modifications may be made in the details within the scope of equivalents of the claims and without departing from the present disclosure.

The direction descriptions such as "front," "rear," "up," and "down" involved herein are only for the convenience of understanding, and the present disclosure is not limited to these directions, but may be adjusted according to actual situation.

Figures 1A, 1B, 1C, 1D, 1E, 1F:
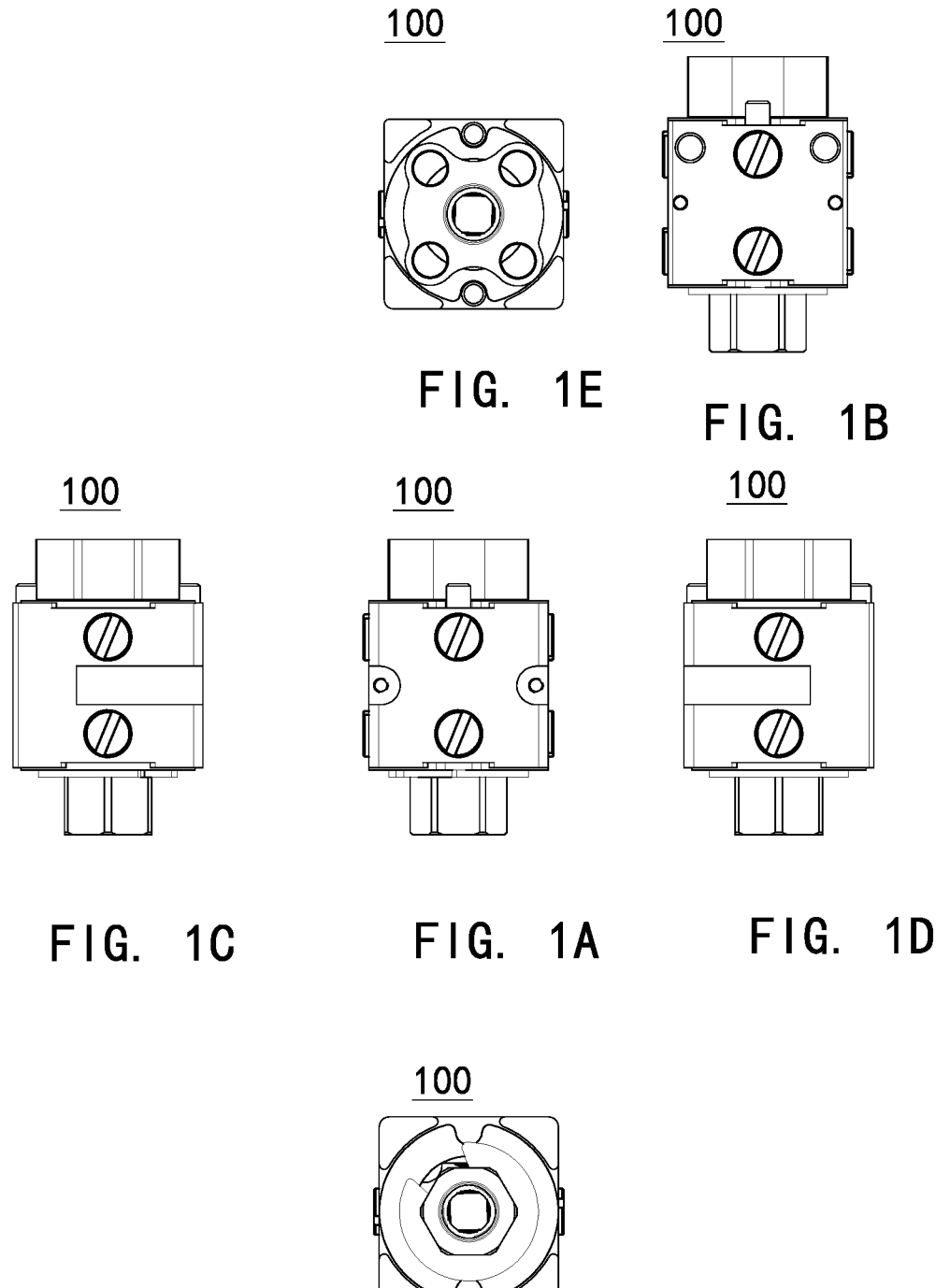
FIGS. 1A-1F are front, rear, left, right, top and bottom views, respectively, of a connector according to a first embodiment of the present application.
Figure 1G:
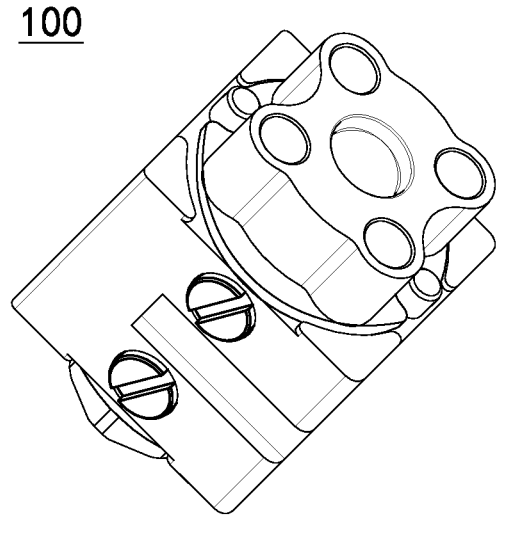
FIGS. 1G-1J are perspective views of the connector at different angles, respectively.
Figure 1H:
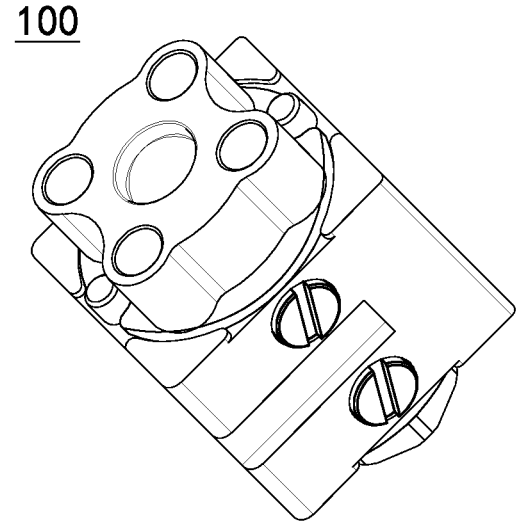
Figure 1I:
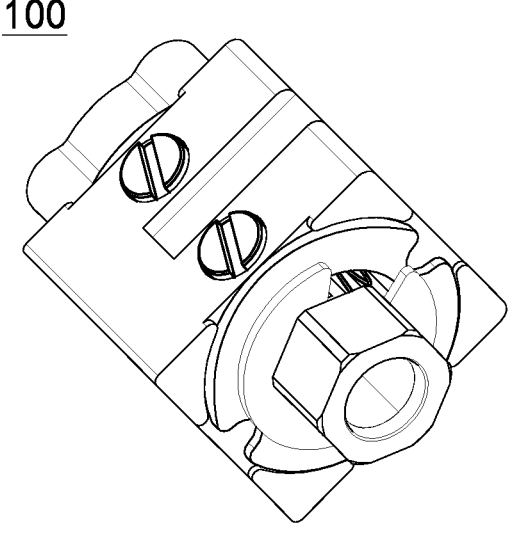
Figure 1J:
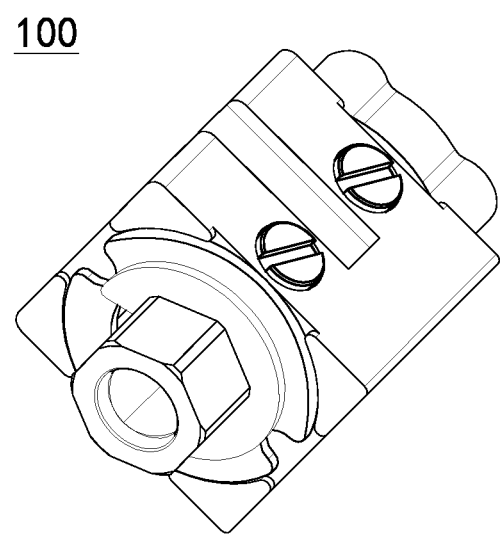
Figure 2:
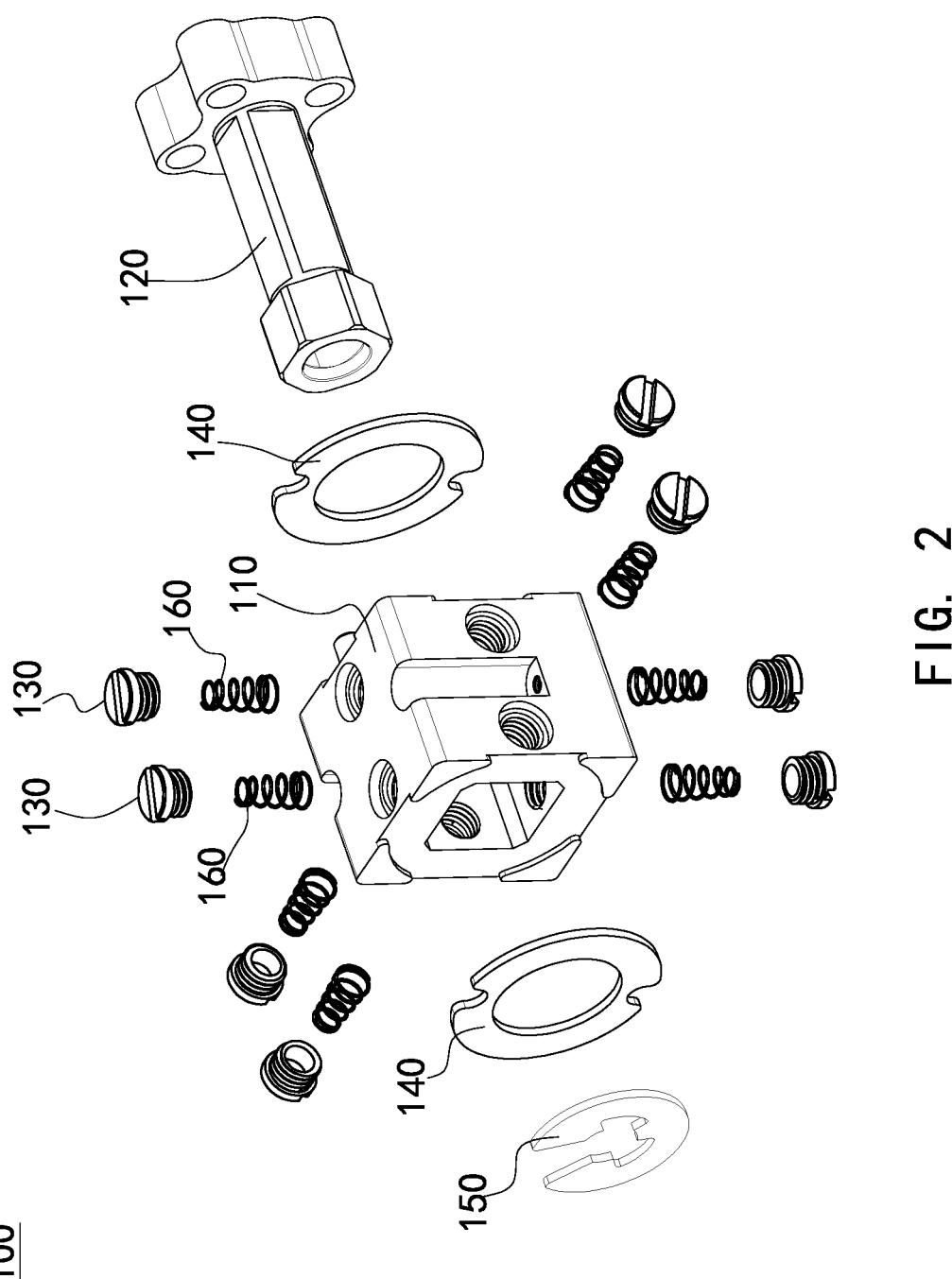
FIG. 2 is an exploded perspective view of the connector.

A connector 100 according to a first embodiment of the present application is described in entirety with reference to FIGS. 1A-2. The connector 100 includes a housing 110, a pipeline 120, a floating device (i.e., a bolt 130 and a spring 160), a gasket 140, and a snap ring 150. The housing 110 at least partially accommodates other components of the connector 100 and is mounted to a first object, such as a mounting base 200. The mounting base 200 may be a part of an apparatus such as a server. The pipeline 120 penetrates the housing 110 in a flow direction of the fluid, and is connected between an outlet device 500 (e.g. a source of cooling liquid) and an inlet device 600 (e.g. a cooling pipeline 120 inside the server). The floating device allows the pipeline 120 to be floatingly disposed in the housing 110, that is, the pipeline 120 is not fixed in the housing 110, but can float within a certain range with respect to the housing 110, particularly in a direction transverse to the flow direction of the liquid (also referred to as a radial direction of the pipeline 120). The floating device, the gasket 140, and snap ring 150 are used to achieve a floating device of the pipeline 120, as will be described in detail below.

A specific structure of the housing 110 is described with reference to FIGS. 3A-3B.

The housing 110 is generally square-shaped with two pairs of mutually opposite sidewalls 111 extending in the flow direction and two end walls 112 perpendicular to the flow direction. A accommodating cavity 113 is provided in the housing 110 and it penetrates the housing 110 in the flow direction. The accommodating cavity 113 has a generally square-shaped cross section. A mounting groove 117 is provided on a surface of each sidewall 111 of the pair of the sidewalls 111, and the mounting groove 117 extends over a partial height of the sidewall 111 so that the housing 110 is mounted to the mounting base 200 by a bolt penetrating the remaining height of the sidewall 111. In other embodiments, the outer surface of the housing 110 may have a different shape, e.g., a cylindrical shape or a hexagonal prism shape. The accommodating cavity 113 of the housing 110 may also have a different shape, such as a cylindrical shape or a hexagonal prism shape, and the outer surface of the housing 110 and the accommodating cavity 113 do not have to have the same shape.

Each sidewall 111 of the housing 110 is provided with a set of bolt holes 114, and the bolt holes 114 penetrate the sidewall 111 and have thread. In this embodiment, each set of bolt holes 114 includes two bolt holes 114 arranged in the flow direction. In other embodiments, more or fewer sets of bolt holes 114 may be provided, e.g., only one set of bolt holes 114 may be provided on each of the two sidewalls 111, and each set of the bolts may include more or fewer bolt holes 114, e.g., one bolt hole 114 or three bolt holes 114 per set of bolt holes 114, and the number of each set of the bolt holes 114 need not be the same.

Figure 5A:
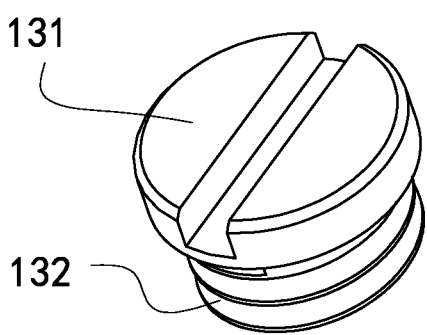
FIGS. 5A and 5B are perspective views of the bolt of the connector at different angles, respectively.
Figure 5B:
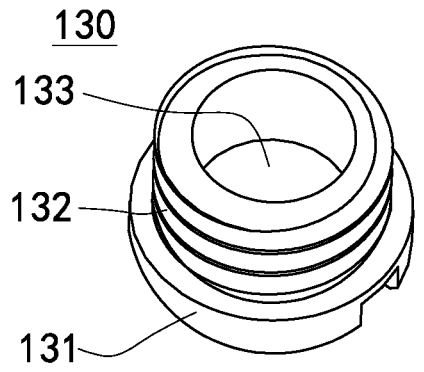

Referring to FIGS. 5A and 5B at the same time, a specific structure of the bolt 130 is shown. The bolt 130 includes a screwing portion 131, a threaded portion 132, and an abutting portion 133. Among them, the screwing portion 131 is circular and has a groove provided on an outer surface thereof for accommodating a screwing tool. The threaded portion 132 extends from the screwing portion 131 toward the inside the housing 110. The abutting portion 133 is formed at one end of the threaded portion 132 opposite to the screwing portion 131, specifically, formed at a center of the threaded portion 132 recessed toward the screwing portion 131.

The floating device of the present application includes at least one bolt 130 and at least one spring 160, the bolt 130 penetrates the sidewall 111 of the housing 110 in the radial direction, and the spring 160 is abutted between the bolt 130 and the sidewall 111 of the pipeline 120, allowing the pipeline 120 to float in the radial direction. In this embodiment, the bolts 130 and the springs 160 are provided on each sidewall 111 of the housing 110, that is, four sets of the floating devices are surroundingly disposed on housing 110 at uniform intervals in a circumferential direction, and each set of the floating devices includes two floating devices arranged in the flow direction. The pipeline 120 is abutted in all directions and is thus stably held while being able to float radially. In this embodiment, the bolt 130 is used to mount and abut the spring 160. In other embodiments, the bolt 130 can also be used to adjust the position of the pipeline 120. For example, by screwing the bolt 130, the radial position of the bolt 130 with respect to the housing 110 may be changed, so as to regulate the suspension position of the pipeline 120.

In other embodiments, the floating device may be provided in a different form, e.g., a flexible substance or liquid filled inside the housing 110.

Figure 3A:
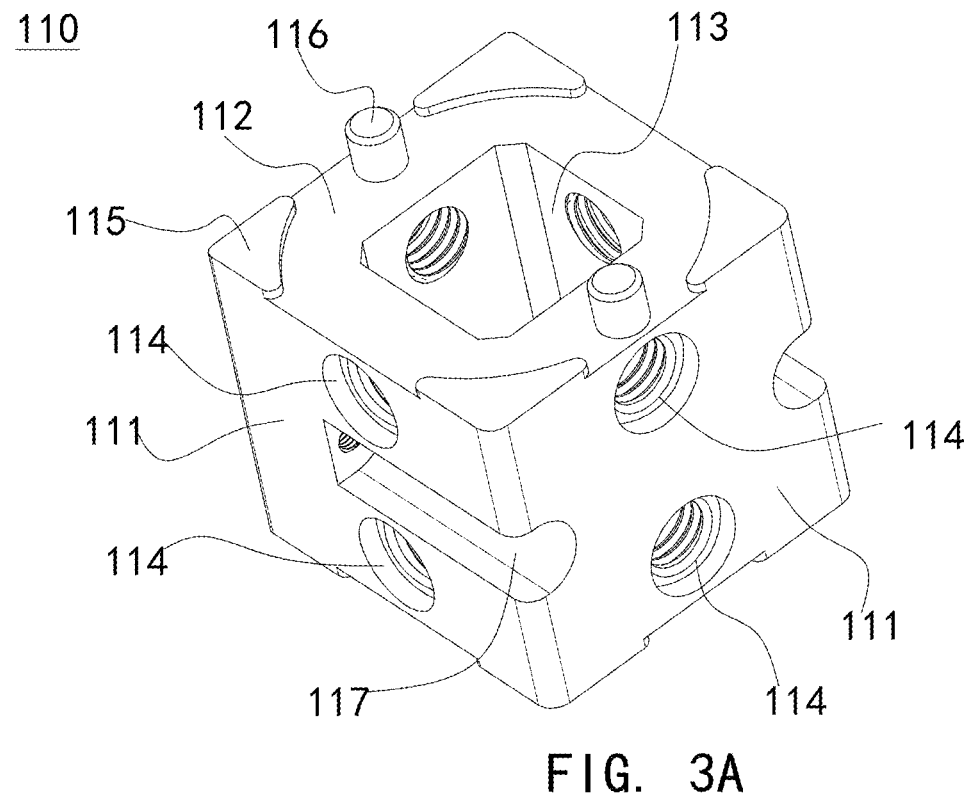
FIGS. 3A and 3B are perspective views of the housing of the connector at different angles, respectively.
Figure 3B:
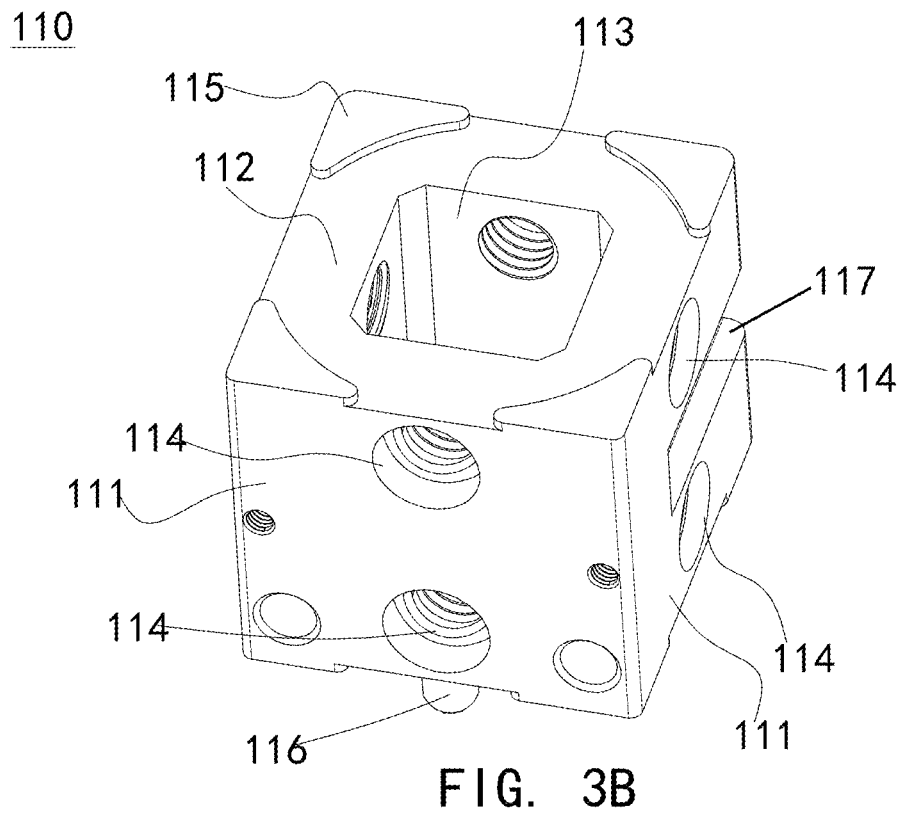
Figure 6:
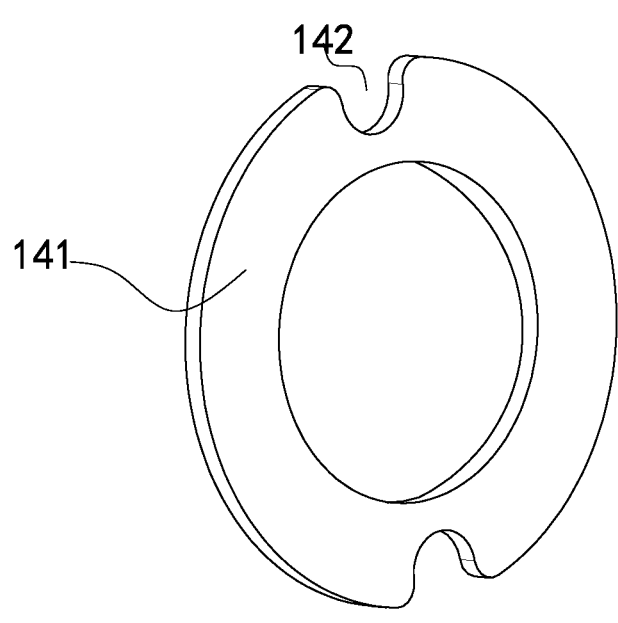
FIG. 6 is a perspective view of the gasket of the locking device.

With continuing reference to FIGS. 3A and 3B, and with reference to FIG. 6 at the same time, the specific shape of the gasket 140 is shown. The gasket 140 includes an annular portion 141, and a notch 142 which is inwardly recessed in the radial direction is provided on the periphery of the gasket 140.

The gasket 140 is sleeved on the intermediate segment 123 of the pipeline 120, specifically, sleeved at a position near at least one of the outlet end and the inlet end 122 of the intermediate segment 123. The gasket 140 is sleeved on the exterior of pipeline 120 and abuts the end wall 112 of the housing 110 in the flow direction so as to prevent inclination of the pipeline 120 with respect to the housing 110. A first limiting portion 115 protruding outwards in the flow direction is provided on the at least one end wall 112 of the housing 110, and the first limiting portion 115 at least partially surrounds the periphery of the gasket 140 so as to prevent the gasket 140 from sliding with respect to the housing 110 (Referring to FIG. 2). In this embodiment, the first limiting portion 115 is a protrusion portion having a generally triangular shape, and the first limiting portion 115 is provided at each corner of each end wall 112 of the housing 110. As such, the plurality of first limiting portions 115 includes the gasket 140 in the radial direction. The first limiting portion 115 is used to prevent the gasket 140 from sliding radially (i.e., transverse to the flow direction) with respect to the housing 110, thereby avoiding wear of the housing 110.

In this embodiment, two gaskets 140 are provided at both ends of the housing 110, respectively, i.e., clamped on both end walls 112 of the housing 110, thereby preventing the inclination of the pipeline 120 with respect to the housing 110. Also, since both ends of the housing 110 are provided with the first limiting portions 115, radial sliding of the two gaskets 140 with respect to the housing 110 is prevented, which further prevents inclination of the pipeline 120 with respect to the housing 110.

A second limiting portion 116 extending outwards in the flow direction is provided on at least one end wall 112 of the housing 110, and the second limiting portion 116 corresponds to the position of the notch 142 of the gasket 140 so as to prevent the gasket 140 from sliding with respect to the housing 110 (referring to FIG. 2). In this embodiment, the second limiting portion 116 is only disposed on the end wall 112 near the inlet end 122, however, it should be understood that the second limiting portions 116 may be disposed on both end walls 112, or the second limiting portion 116 may not be disposed.

Figure 4A:
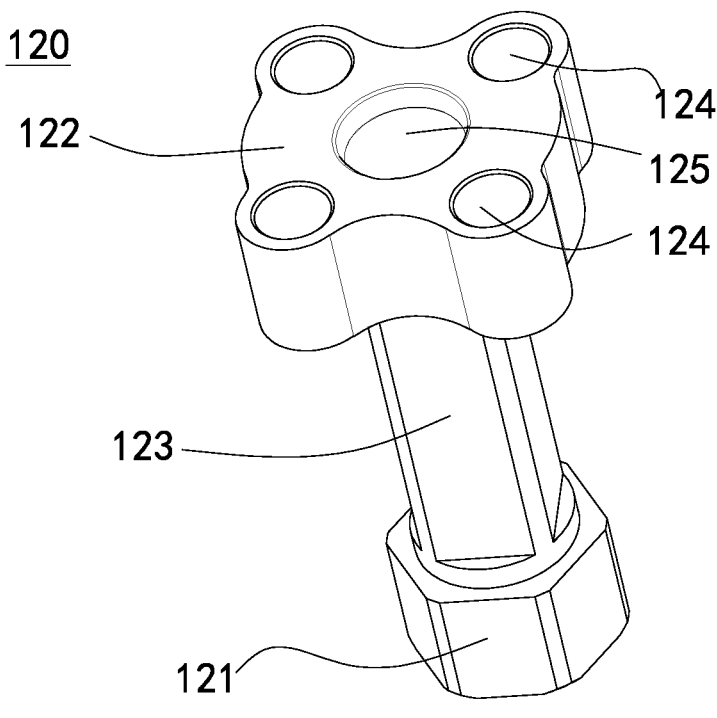
FIGS. 4A and 4B are perspective views of the pipeline of the connector at different angles, respectively.
Figure 4B:
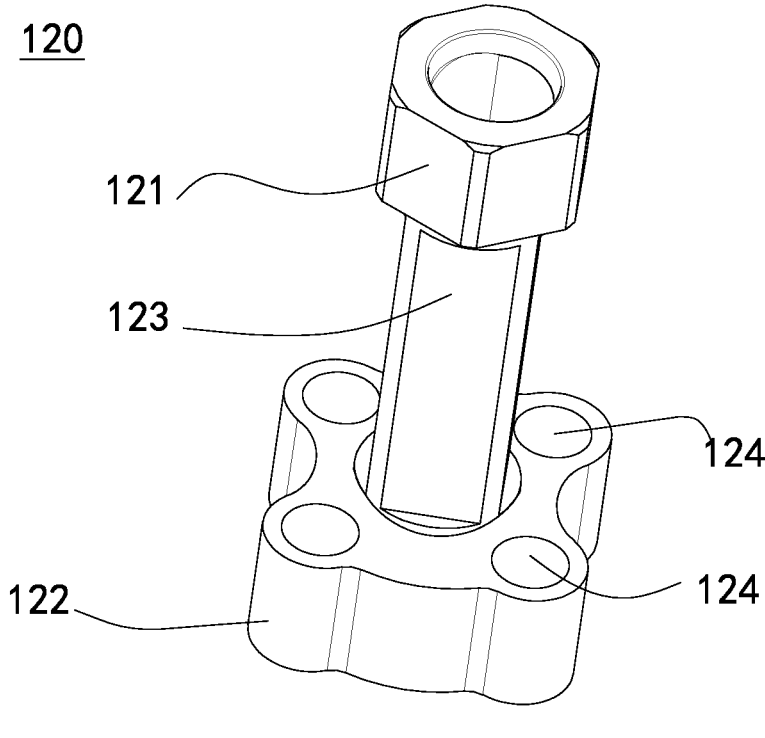

A specific structure of the pipeline 120 is described with reference to FIGS. 4A and 4B.

The pipeline 120 includes an outlet end 121, an inlet end 122, and an intermediate segment 123 connected between the outlet end 121 and the inlet end 122. The outlet end 121 and the inlet end 122 are both located outside of the housing 110, and the intermediate segment 123 is located inside of the housing 110.

The outlet end 121 is provided with a mounting nut for connecting to the outlet device 500. The inlet end 122 is provided with an inlet connector mounting hole 125 and at least one guide mounting hole 124. The inlet connector mounting hole 125 is located at the center of the inlet end 122, and the guide mounting hole 124 surrounds the inlet connector mounting hole 125. The radial dimension of the inlet end 122 is greater than the radial dimension of the intermediate segment 123. The guide mounting hole 124 is located radially outside of the intermediate segment 123 when viewed in the flow direction. In this embodiment, four guide mounting holes 124 are uniformly distributed around the inlet connector mounting hole 125, but the number of the guide mounting holes 124 is not limited thereto.

In this embodiment, the cross section of the intermediate segment 123 is square-shaped, however, in other embodiments, other shapes are possible, such as circular or hexagonal. Also, the shape of the intermediate segment 123 does not necessarily correspond to the shape of the accommodating cavity 113 of the housing 110.

Figure 7:
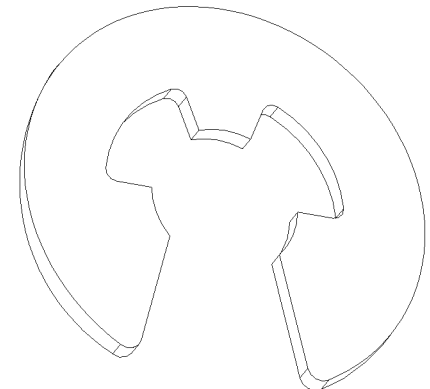
FIG. 7 is a perspective view of the snap ring of the locking device.

Referring to FIG. 7, a specific shape of the snap ring 150 is shown. In this embodiment, the snap ring 150 is generally E-shaped. Meanwhile with reference to FIG. 2, the snap ring 150 is sleeved at the inlet end 122 of the pipeline 120 and abuts against the outer side of the gasket 140 at the inlet end 122. As such, the snap ring 150 is able to prevent axial movement of the pipeline 120 with respect to the housing 110 (i.e., movement in the flow direction of the liquid).

Figure 8:
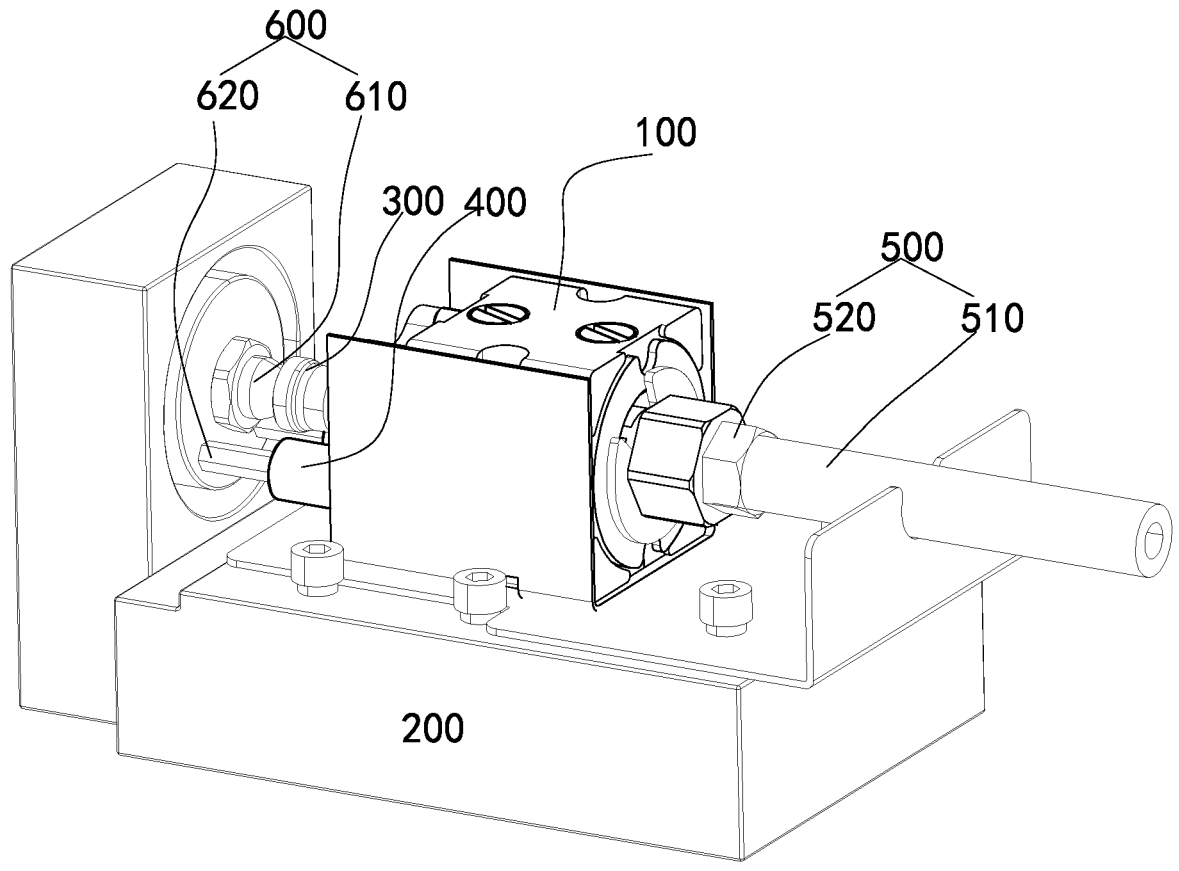
FIG. 8 is a perspective view of a connecting system according to the present application.
Figure 9A:
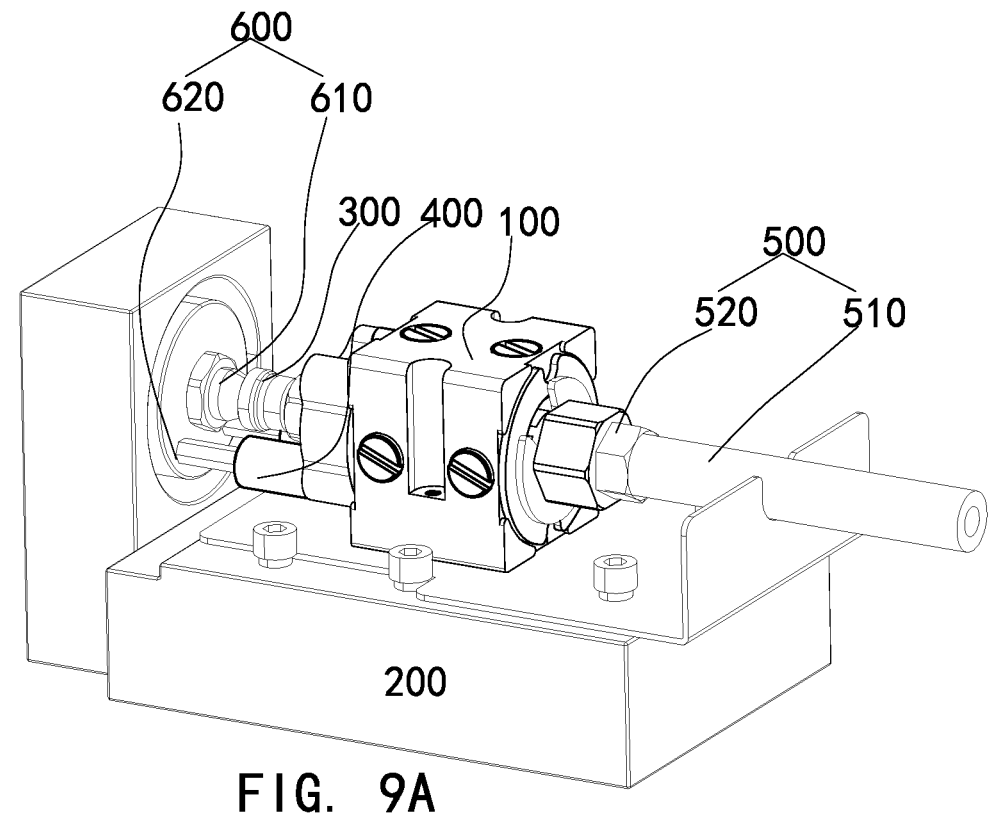
FIGS. 9A and 9B are perspective views of the connecting system at different angles, respectively, with the wall portion of the base removed to show the connector.
Figure 9B:
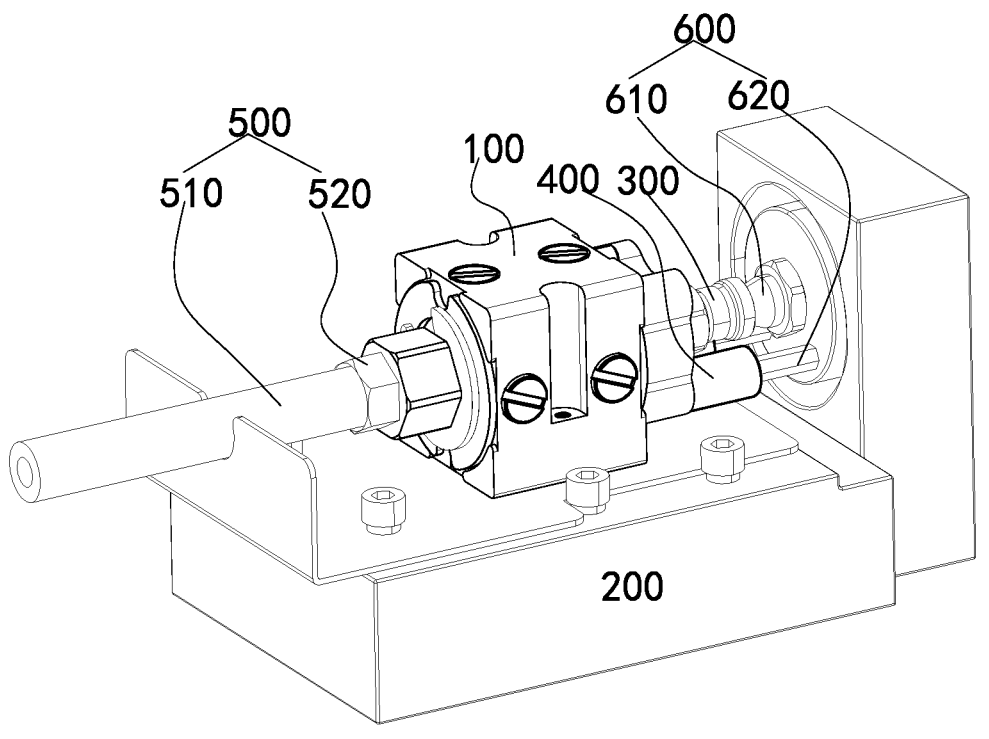

The connecting system 1 according to the present application is described with reference to FIGS. 8-10. The connecting system 1 includes a connector 100, an outlet device 500, and an inlet device 600.

The connector 100 is mounted on the mounting base 200, and the mounting base 200 is for example a part of a server or a component fixed to a server.

The outlet device 500 includes an outlet pipe 510 and an outlet bolt 520, and the outlet pipe 510 is connected to the outlet end 121 of the connecting system 1 by the outlet bolt 520. In practical applications, the form of the outlet end 121 may also be changed accordingly, depending on the form of the outlet device 500.

The inlet device 600 includes an inlet connector 300, at least one guide 400, an inlet pipe 610, and a docking part 620. The inlet connector 300 is disposed at the inlet connector mounting hole 125 at the center of the inlet end 122 of the pipeline 120, and is connected to the inlet pipe 610 of the inlet device 600. The guide 400 is disposed at the inlet end 122 and surrounds the inlet connector 300, and aligned with the docking part 620 of the inlet device 600 to guide the inlet connector 300 to connect to the inlet pipe 610.

More specifically, the inlet pipe 610 is connected to the inlet connector 300 and the docking part 620 is connected to the guide 400. The inlet connector 300 connects the inlet pipe 610 to the connector 100, specifically, to the inlet connector mounting hole 125 of the housing 110. The guide 400 is disposed around the inlet connector 300 for connecting the docking part 620 to connector 100, and specifically, to the guide mounting hole 124 of the housing 110. When the user connects the connecting system 1 to the inlet device 600, the guide 400 may be inserted in alignment with the guide mounting hole 124 to assist the inlet connector 300 in aligning with the inlet connector mounting hole 125 so that the inlet connector 300 is smoothly connected to the inlet connector mounting hole 125. Thanks to the floating function of the pipeline 120, the outlet device 500 and the inlet device 600 are allowed to be smoothly and stably connected to the connector 100 even if the position of the outlet device 500 or the inlet device 600 is not very accurate, thus improving the versatility of the connector 100 for different outlet devices 500 and inlet devices 600.

It may be readily understood that if the connecting system does not have a floating function, i.e. the housing is fixed to the mounting base and the pipeline is fixed to the housing, the inlet pipe is not aligned with the inlet connector if the position of the inlet device is not very accurate. At this point, the inlet connector can only be forcibly connected to the inlet pipe, which may cause problems such as unstable connection and leakage. The present application avoids this disadvantageous situation.

Figure 10:
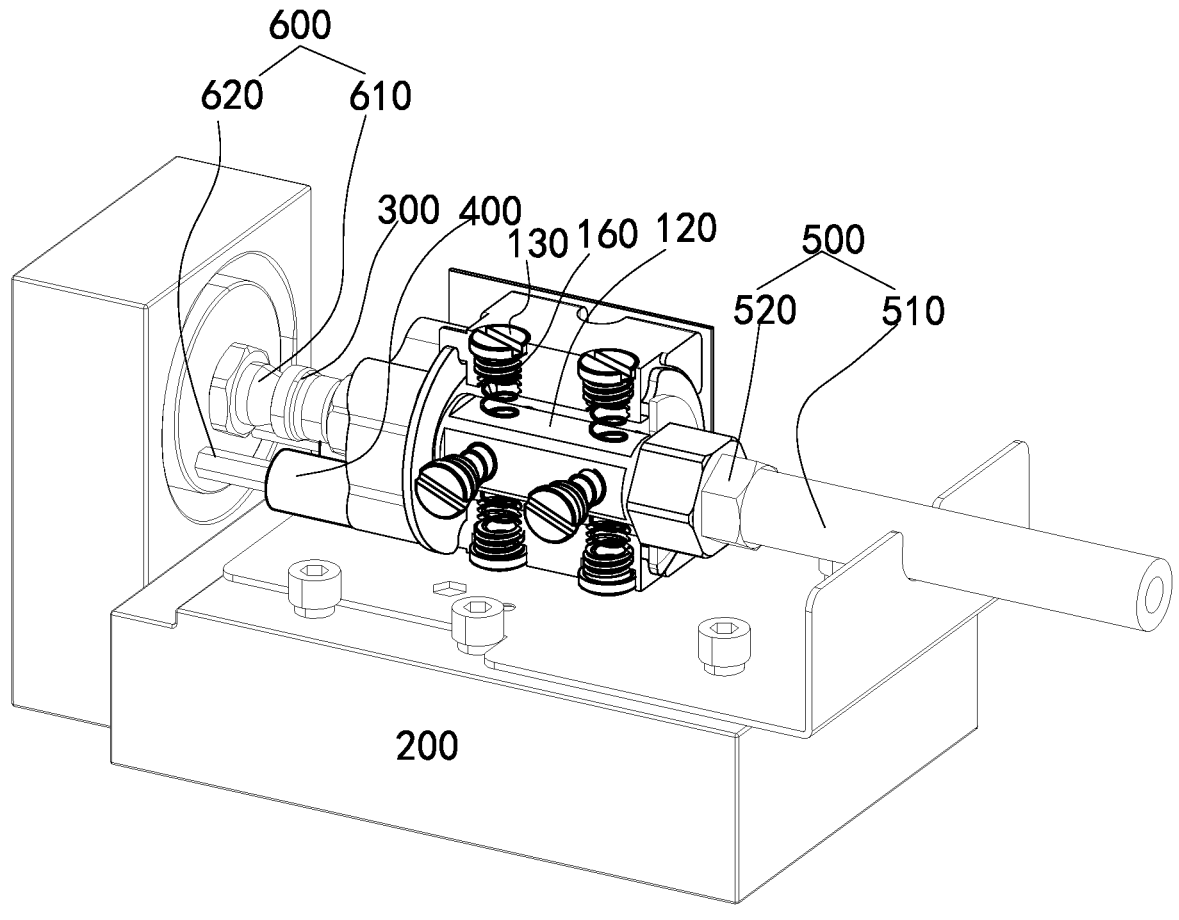
FIG. 10 is a perspective view of the connecting system with the housing partially removed to show the interior of the connector.
Figures 11A, 11B, 11C, 11D, 11E, 11F:
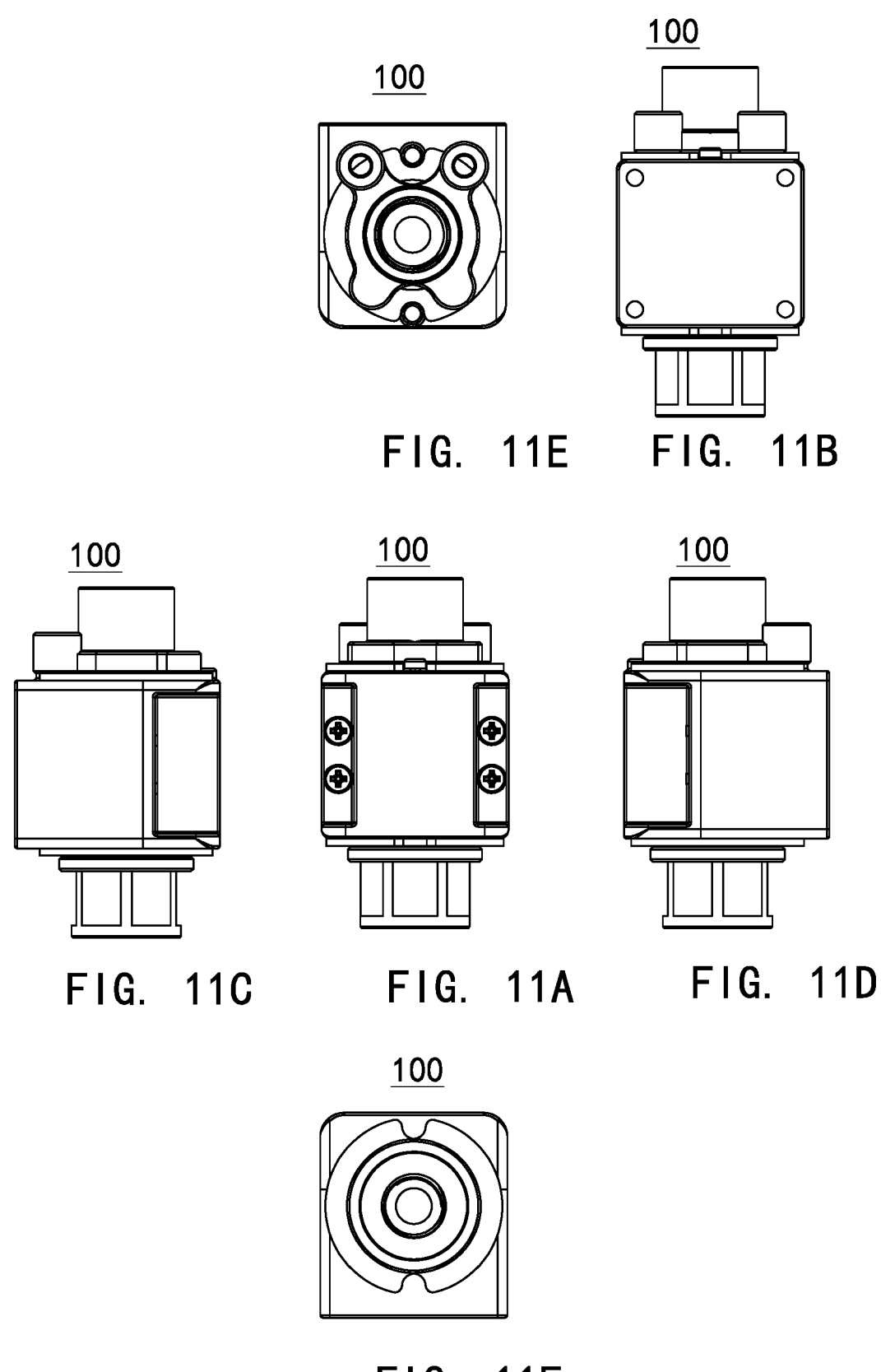
FIGS. 11A-11F are front, rear, left, right, top and bottom views, respectively, of a connector according to a second embodiment of the present application.
Figure 11G:
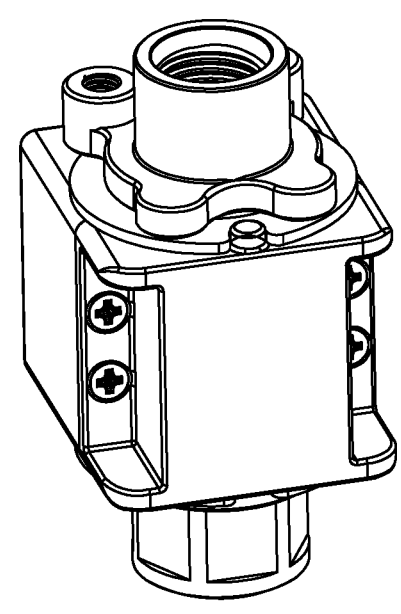
FIGS. 11G-11H are perspective views of the connector at different angles, respectively.
Figure 11H:
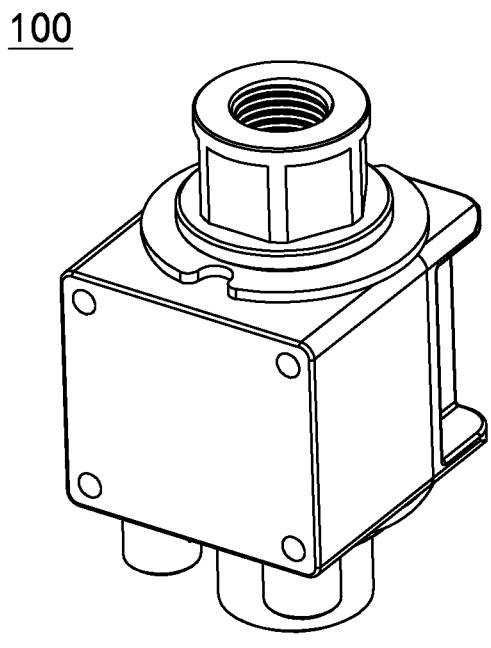
Figure 12:
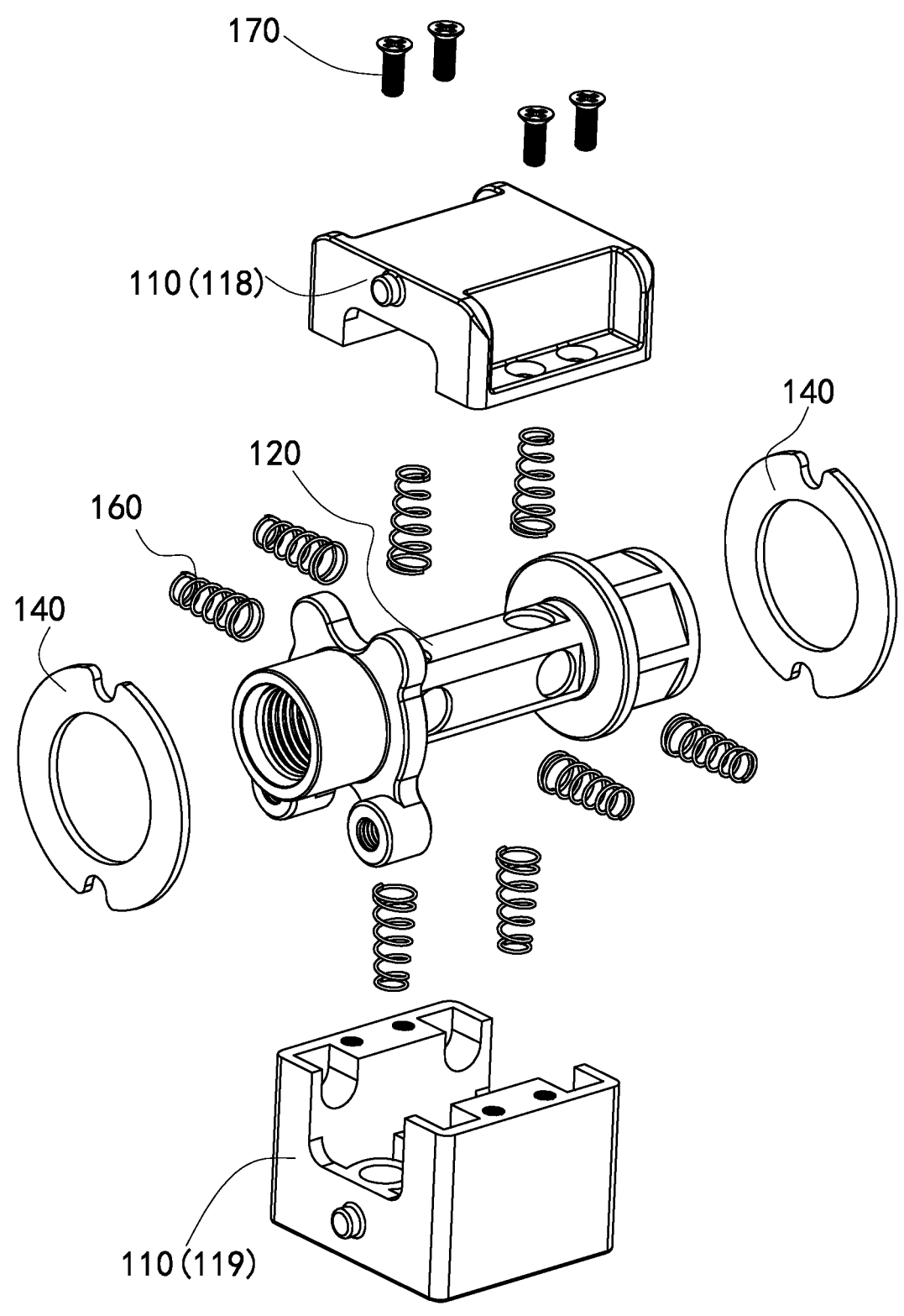
FIGS. 12 and 13 are exploded perspective views of the connector, respectively.
Figure 13:
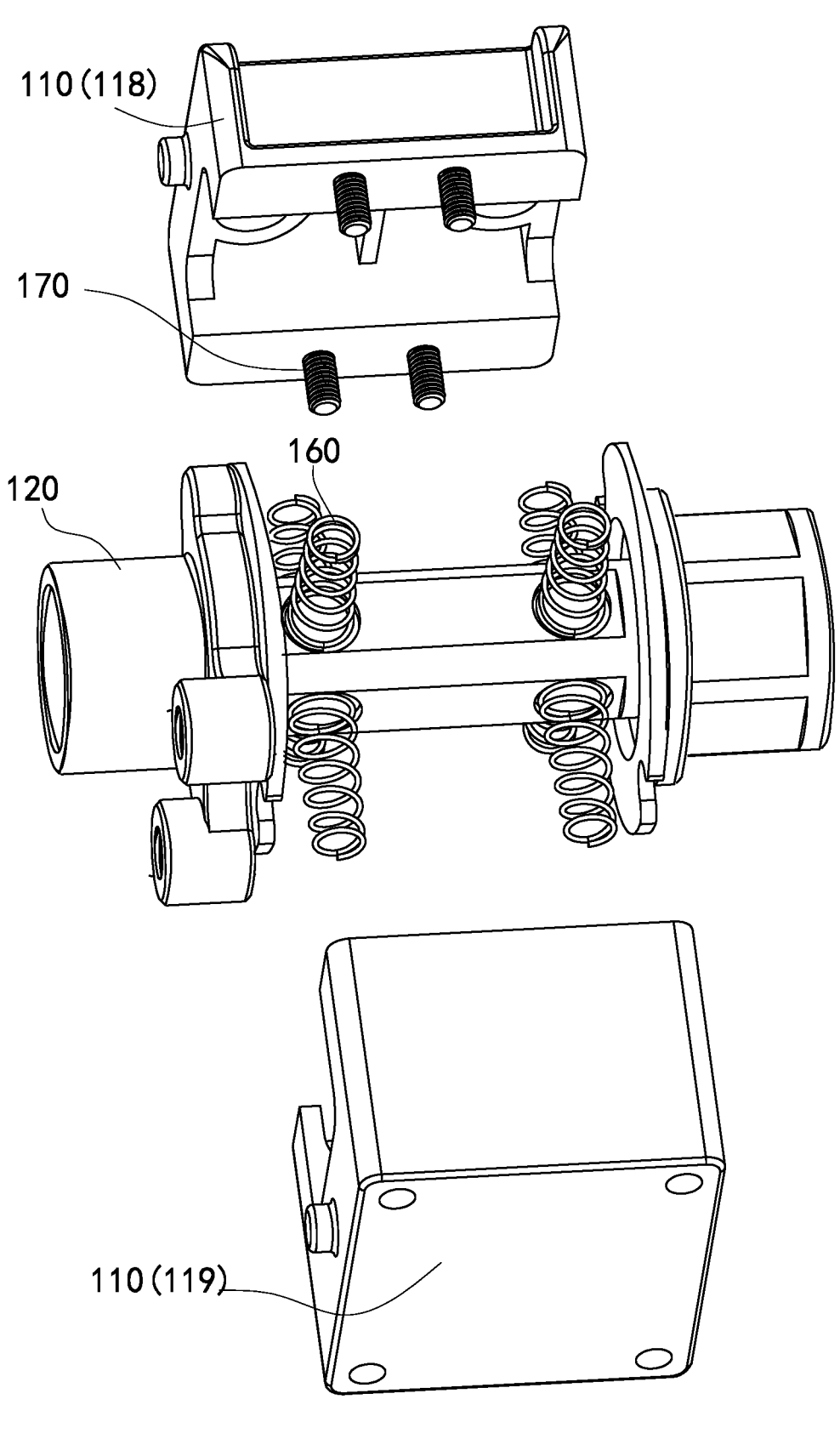

Referring to FIG. 10, it can also be seen more clearly that the bolt 130 and spring 160 are abutted against the pipeline 120 in all directions.

A connector 100 according to a second embodiment of the present application is described in entirety with reference to FIGS. 11A-13.

The connector 100 of the second embodiment is generally the same as the first embodiment. One difference between the two is that the housing 110 of the connector 100 in the second embodiment is formed by assembling the first housing 118 and the second housing 119 in a transversal direction (perpendicular to the flow direction), and the assembling member 170 is used to assemble the first housing 118 and the second housing 119. Also, the bolt 130 and the snap ring 150 are omitted in the second embodiment.

Figure 14A:
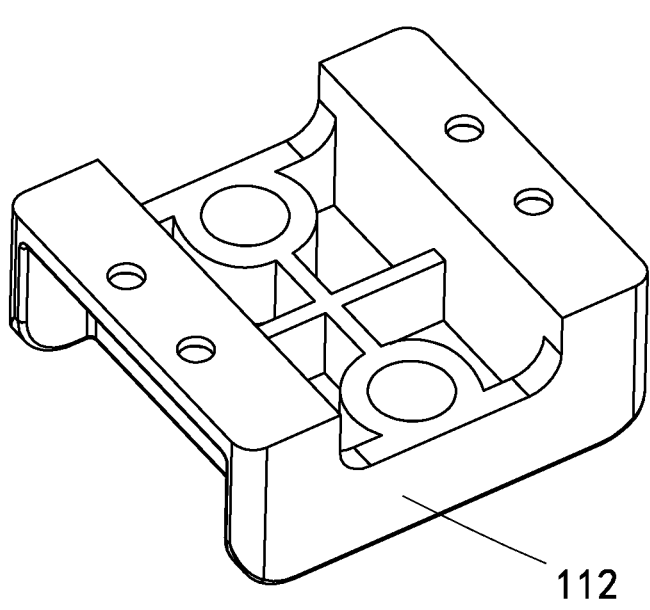
FIGS. 14A and 14B are perspective views of the first housing of the connector at different angles, respectively.
Figure 14B:
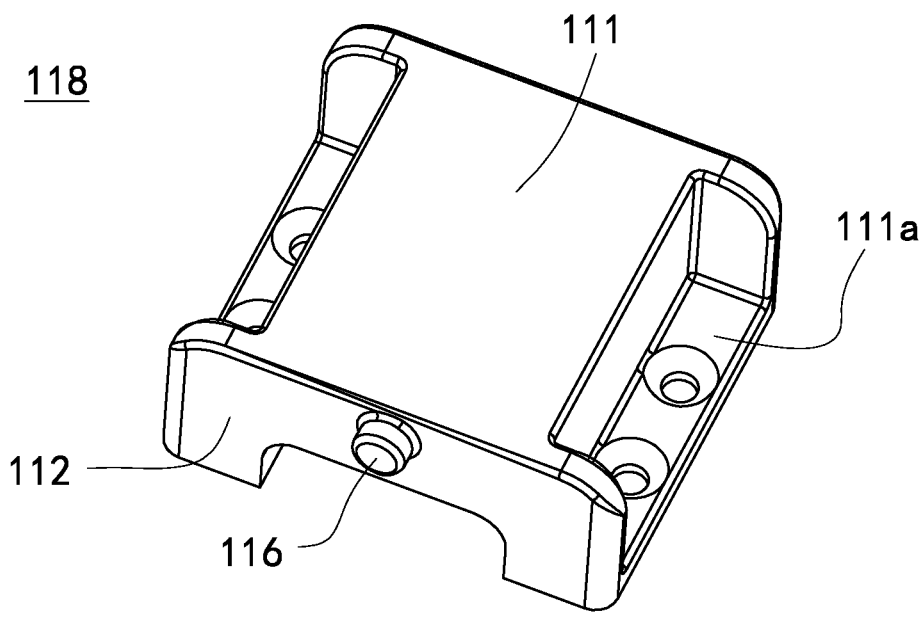

A specific structure of the first housing 118 is described with reference to FIGS. 14A and 14B.

The first housing 118 is of a half-box structure including the sidewall 111. Each end of the sidewall 111 is a portion of two end walls 112, respectively, and the other portion of each end wall 112 is on the first housing 119. Each end wall 112 may be provided with a first limiting portion 116, which may be provided in the manner described with reference to the first embodiment. The first housing 118 is open at opposite sides of the sidewall 111 to form an accommodating space in combination with the second housing 119. Both sides of the sidewall 111 are respectively provided with a depression 111a, which is recessed toward the accommodating space, and provided with an assembling hole for inserting the assembling member 170 therein.

Figures 15A, 15B:
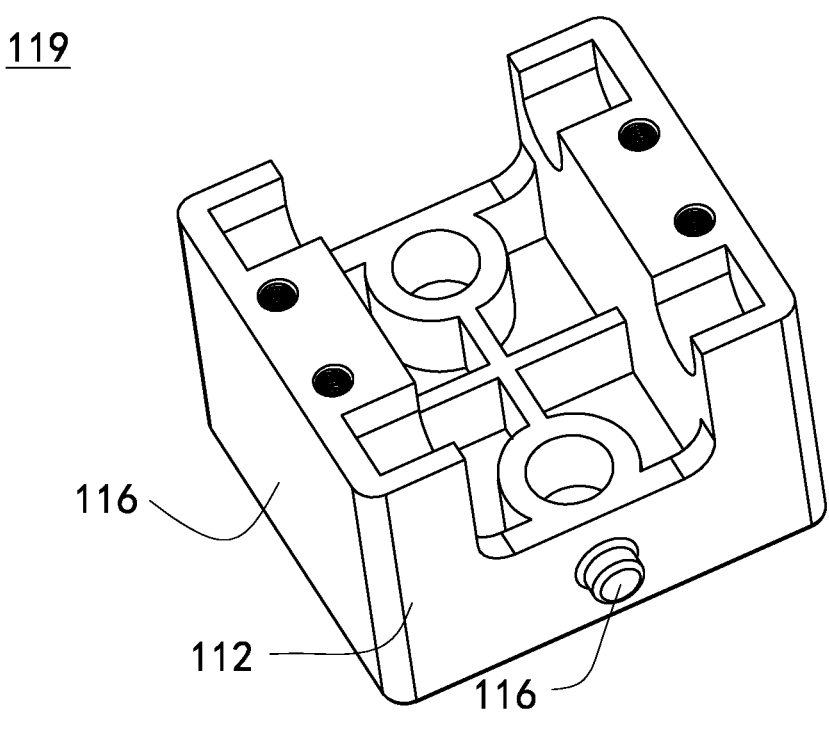
FIGS. 15A and 15B are perspective views of the second housing of the connector at different angles, respectively.

A specific structure of the second housing 119 is described with reference to FIGS. 15A and 15B.

The second housing 119 is of a half-box structure, similar to the first housing 118. The second housing 119 has another sidewall 111I and the other portion of the two end walls 112. When the first housing 118 and the second housing 119 are assembled together, the complete housing 110 is formed.

In the second embodiment, the spring 160 is not mounted to the housing 110 by the bolt as in the first embodiment, but the spring 160 is disposed in blind holes in the interior of the first and second housings 118 and 119.

In this embodiment, the assembling member 170 may be a plurality of bolts, and in other embodiments, the assembling member 170 may be an engagement part, solder, or the like.

Figure 16A:
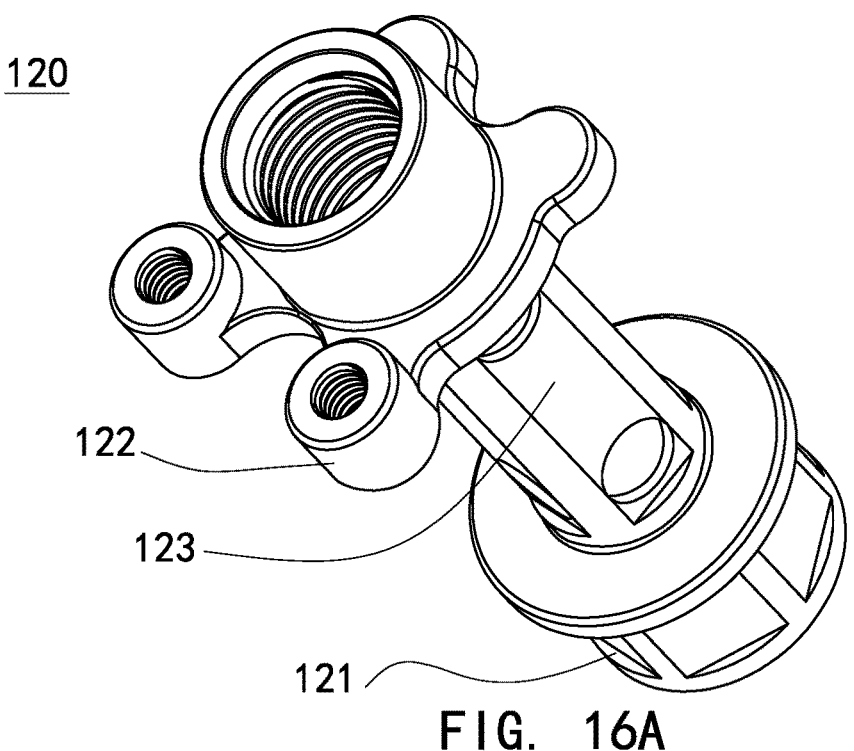
FIGS. 16A and 16B are perspective views of the pipeline of the connector at different angles, respectively.
Figure 16B:
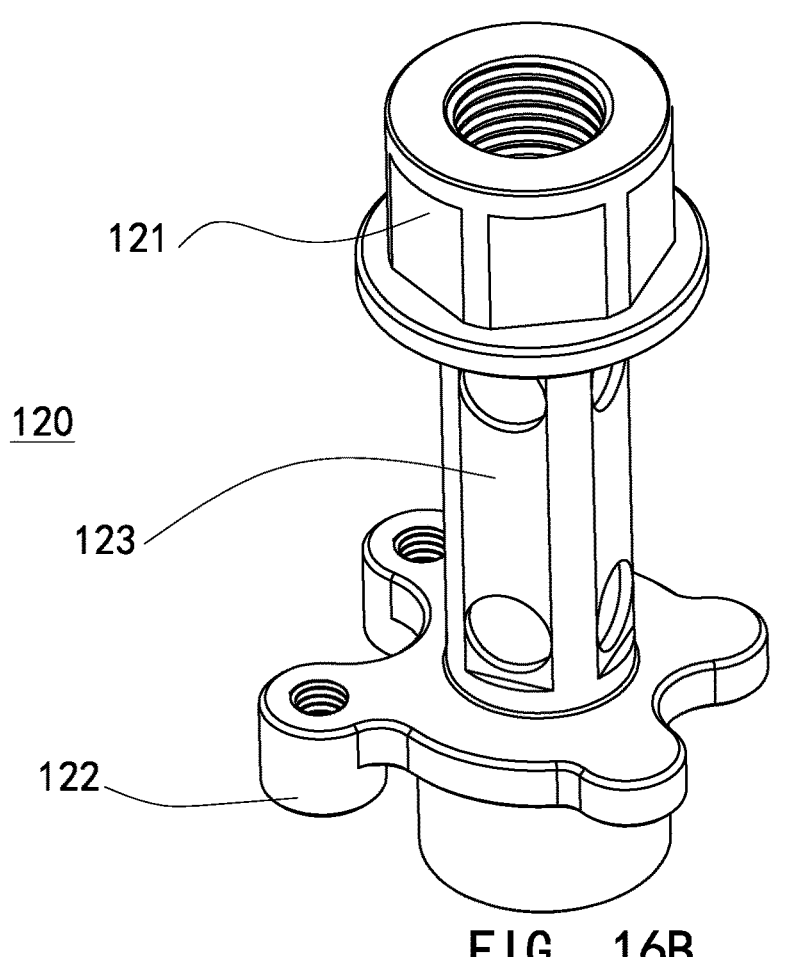

The pipeline 120 according to the second embodiment is described with reference to FIGS. 16A-16B.

The pipeline 120 of the second embodiment may include an outlet end 121, an inlet end 122, and an intermediate segment 123 similar to those in the first embodiment. Unlike the first embodiment, the outlet end 121, the inlet end 122 of the pipeline 120 in the second embodiment may have a transverse dimension larger than the corresponding dimension of the accommodating space in the housing 110, because in the second embodiment the pipeline 120 may be placed in the housing 110 first, and then the first housing 118 and the second housing 119 may be assembled to form the complete housing 110. Since the outlet end 121 and the inlet end 122 of the pipeline 120 of the second embodiment may have a larger transverse dimension, the snap ring 140 may be omitted.

Figure 17A:
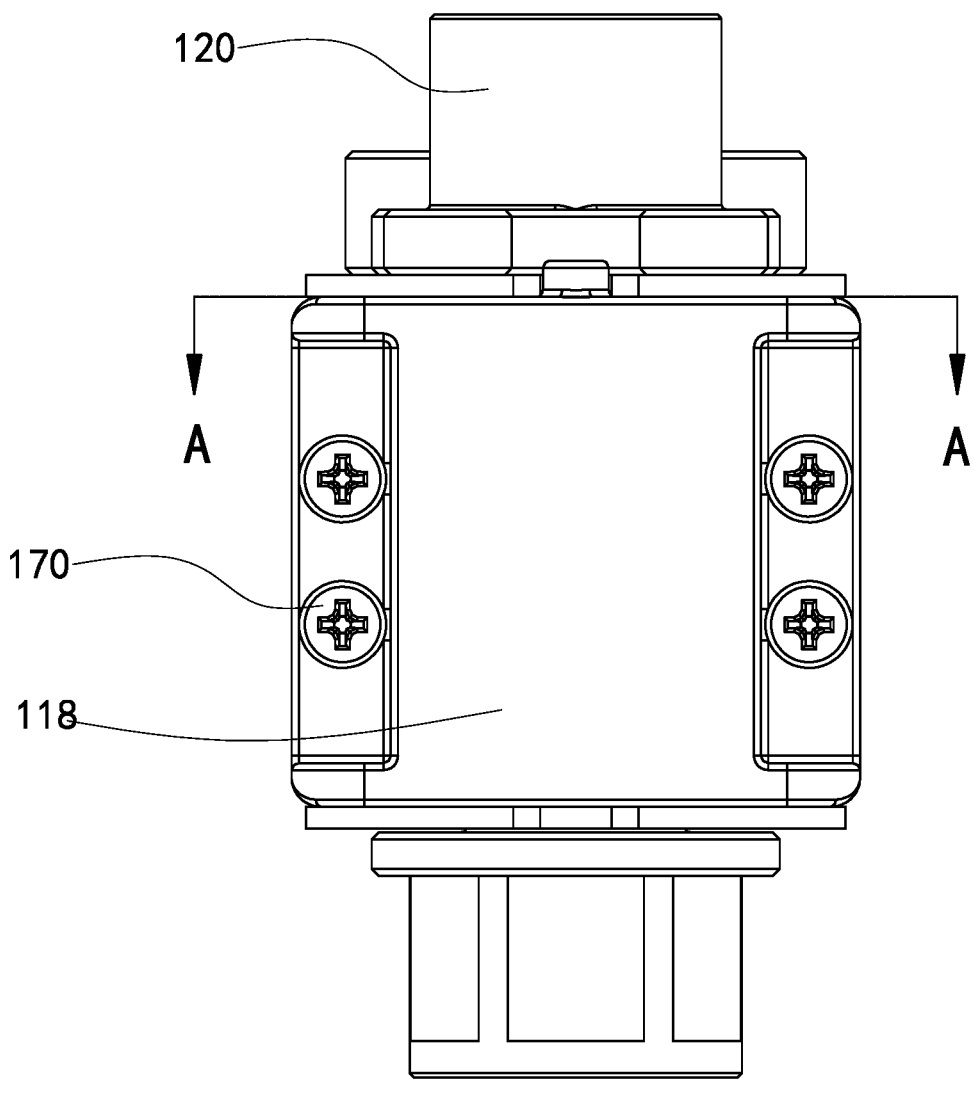
FIG. 17A is a front view of the connector.
Figure 17B:
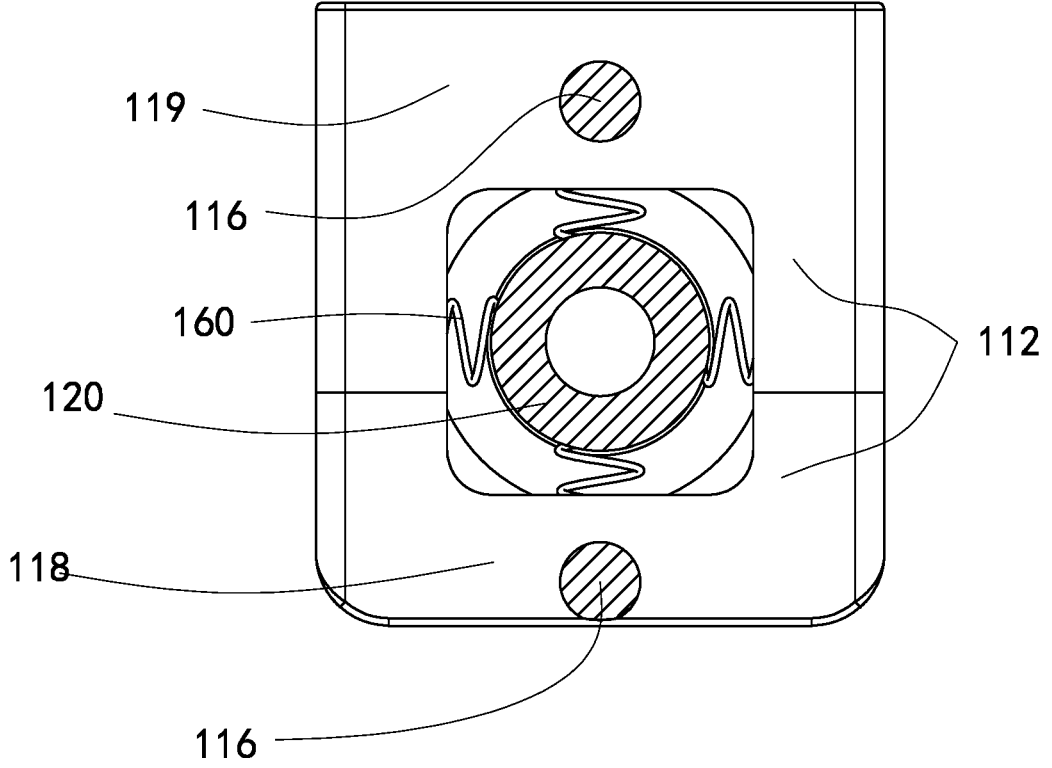
FIG. 17B is a cross-section view taken along A-A line in FIG. 17A.

Referring to FIGS. 17A and 17B, it can be seen that the pipeline 120 is accommodated in the accommodating space of the housing 110, and a plurality of springs 160 are disposed between the inner sidewall of the housing 110 and the pipeline 120 so as to abut against the pipeline 120 from a plurality of directions and to adjust its position.

While preferred embodiments have been shown and described herein, it should be understood that such embodiments are provided by way of example only. Numerous variations, changes and substitutions will occur to those skilled in the art without departing from the spirit and scope of the present disclosure. Accordingly, it is intended that the appended claims cover all such variations as fall within the spirit and scope of the present disclosure.

REFERENCE SIGNS LIST

1 Connecting System
  100 Connector
  110 Housing
    111 Sidewall
      111a Depression
    112 End Wall
    113 Accommodating Cavity
    114 Bolt Hole
    115 First Limiting Portion
    116 Second Limiting Portion
    117 Mounting Groove
    118 First Housing
    119 Second Housing
  120 Pipeline
    121 Outlet End
    122 Inlet End
    123 Intermediate Segment
    124 Guide Mounting Hole
    125 Inlet Connector Mounting Hole
  130 Bolt
    131 Screwing Portion
    132 Threaded Portion
    133 Abutting Portion
  140 Gasket
    141 Annular Portion
    142 Notch
  150 Snap Ring
    151 E-Shaped Portion
    152 Opening
  160 Spring
  170 Assembling Member
  200 Mounting Base (First Object)
  300 Inlet Connector
  400 Guide
  500 Outlet Device
    510 Outlet Pipe
    520 Outlet Bolt
  600 Inlet Device
    610 Inlet Pipe
    620 Docking Part

What is claimed is:

1. A connector (100) mounted to a first object and connected between an outlet device (500) and an inlet device (600) to direct a fluid, wherein the connector (100) comprises:

a housing (110) mounted to the first object;

a pipeline (120) penetrating the housing (110) in a flow direction of the fluid and comprising an outlet end (121) connected to the outlet device (500) and an inlet end (122) connected to the inlet device (600); and a floating device disposed on the housing (110) and floatingly connected to the pipeline (120), allowing the pipeline (120) to float in the radial direction transverse to a flow direction of the fluid with respect to the housing (110), the floating device comprising at least one bolt (130) and at least one spring (160), the bolt (130) penetrates a sidewall (111) of the housing (110) in the radial direction, and the spring (160) is abutted between the bolt (130) and the sidewall (111) of the pipeline (120), allowing the pipeline (120) to float in the radial direction.

2. The connector (100) of claim 1, wherein:

four sets of the floating devices are surroundingly disposed on the housing (110) at uniform intervals in a circumferential direction, and each set of the floating devices comprises two floating devices arranged in the flow direction.

3. The connector (100) of claim 2, wherein the connector (100) further comprises:

at least one gasket (140) having an annular shape and sleeved on the pipeline (120) and abutting against at least one end wall (112) of the housing (110) in the flow direction to prevent inclination of the pipeline (120) with respect to the housing (110).

4. The connector (100) of claim 3, wherein:

a first limiting portion (115) protruding outwards in the flow direction is provided on the at least one end wall (112) of the housing (110), and the first limiting portion (115) at least partially surrounds a periphery of the at least one gasket (140) so as to prevent the at least one gasket (140) from sliding with respect to the housing (110).

5. The connector (100) of claim 3, wherein:

a notch (142) which is inwardly recessed in the radial direction is provided in a periphery of the at least one gasket (140); and a second limiting portion (116) extending outwards in the flow direction is provided on the end wall (112) of the housing (110), and the second limiting portion (116) corresponds to the position of the notch (142) so as to prevent the at least one gasket (140) from sliding with respect to the housing (110).

6. The connector (100) of claim 3, wherein:

the inlet end (122) of the pipeline (120) is also sleeved with a snap ring (150), and the snap ring (150) is generally E-shaped and abuts against an outer side of the at least one gasket (140) at the inlet end (122).

7. The connector (100) of claim 1, wherein:

the pipeline (120) comprises an intermediate segment (123) connected between the outlet end (121) and the inlet end (122), and the outlet end (121) and the inlet end (122) are both located outside of the housing (110), and the intermediate segment (123) is located inside of the housing (110).

8. The connector (100) of claim 7, wherein:

the inlet end (121) of the pipeline (120) is provided with a mounting nut for connecting to the outlet device (500);

the inlet end (122) of the pipeline (120) is provided with: an inlet connector mounting hole (125) located at a center of the inlet end (122); and at least one guide mounting hole (124) surrounding the inlet connector mounting hole (125); and the at least one guide mounting hole (124) is located radially outside of the intermediate segment (123) when viewed in the flow direction.

9. The connector (100) of claim 1, wherein:

the radial position of the floating device with respect to the housing (110) is adjustable to change the floating position of the pipeline (120).

10. The connector (100) of claim 1, wherein:

the housing (110) comprises:

a first housing (118) and a second housing (119) assembled to each other in a transverse direction perpendicular to the flow direction to form the housing (119).

11. A connecting system (1), wherein the connecting system (1) comprises:

the connector (100) of claim 1, wherein the first object is a mounting base (200);

the inlet device (600) comprises an inlet connector (300) and at least one guide (400), wherein the inlet connector (300) is connected to an inlet connector mounting hole (125) at a center of an inlet end (122) of the pipeline (120); and the at least one guide (400) surrounds the inlet connector (300) and is connected to a guide mounting hole (124) at a periphery of the inlet end (122) of the pipeline (120).

12. A connector (100) mounted to a first object and connected between an outlet device (500) and an inlet device (600) to direct a fluid, wherein the connector (100) comprises:

a housing (110) mounted to the first object;

a pipeline (120) penetrating the housing (110) in a flow direction of the fluid and comprising an outlet end (121) connected to the outlet device (500) and an inlet end (122) connected to the inlet device (600);

a floating device disposed on the housing (110) and floatingly connected to the pipeline (120), allowing the pipeline (120) to float in the radial direction transverse to a flow direction of the fluid with respect to the housing (110); and wherein the housing (110) has two pairs of sidewalls (111) opposite to each other, and a mounting groove (117) is provided in one pair of the sidewalls (111) along a surface of each sidewall (111), and the mounting groove (117) extends over a partial height of the sidewall (111) so that the housing (110) is mounted to the first object by a bolt penetrating the remaining height of the sidewall (111).

13. The connector (100) of claim 12, wherein:

the pipeline (120) comprises an intermediate segment (123) connected between the outlet end (121) and the inlet end (122), and the outlet end (121) and the inlet end (122) are both located outside of the housing (110), and the intermediate segment (123) is located inside of the housing (110).

14. The connector (100) of claim 13, wherein:

the inlet end (121) of the pipeline (120) is provided with a mounting nut for connecting to the outlet device (500);

the inlet end (122) of the pipeline (120) is provided with: an inlet connector mounting hole (125) located at a center of the inlet end (122); and at least one guide mounting hole (124) surrounding the inlet connector mounting hole (125); and the at least one guide mounting hole (124) is located radially outside of the intermediate segment (123) when viewed in the flow direction.

15. The connector (100) of claim 12, wherein:

the radial position of the floating device with respect to the housing (110) is adjustable to change the floating position of the pipeline (120).

* * * * *